(12) United States Patent
Yoshida et al.

(10) Patent No.: US 6,512,321 B2
(45) Date of Patent: Jan. 28, 2003

(54) DRIVING APPARATUS AND METHOD OF USING SAME

(75) Inventors: Ryuichi Yoshida, Sakai (JP); Yasuhiro Okamoto, Tondabayashi (JP); Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/789,504

(22) Filed: Feb. 22, 2001

(65) Prior Publication Data

US 2001/0026112 A1 Oct. 4, 2001

(30) Foreign Application Priority Data

Mar. 23, 2000 (JP) ........................................ 2000-081544

(51) Int. Cl.[7] ............................................... H01L 41/08
(52) U.S. Cl. .......................... 310/316.01; 310/316.02; 310/323.02
(58) Field of Search ................. 310/316.01, 316.02, 310/317, 319, 323.02, 328; 359/824; 318/129

(56) References Cited

U.S. PATENT DOCUMENTS

| | | | | |
|---|---|---|---|---|
| 5,587,846 A | * | 12/1996 | Miyano et al. | ............. 359/824 |
| 5,589,723 A | * | 12/1996 | Yoshida et al. | ............. 310/328 |
| 6,047,135 A | * | 4/2000 | Hamada | ................. 310/317 X |
| 6,140,750 A | * | 10/2000 | Ueyama | ..................... 310/369 |
| 6,232,697 B1 | * | 5/2001 | Mizumoto | ................... 310/317 |
| 6,249,093 B1 | * | 6/2001 | Takahata et al. | ............ 318/129 |
| 6,320,298 B1 | * | 11/2001 | Kawabe | ....................... 310/317 |

* cited by examiner

*Primary Examiner*—Mark O. Budd
(74) *Attorney, Agent, or Firm*—Burns, Doane, Swecker & Mathis, LLP

(57) ABSTRACT

A driving apparatus includes an electromechanical conversion element that expands and contracts through the application of a drive voltage, the electromechanical conversion element includes a first end and a second end. The apparatus further includes a support member that is fixed to the first end of the electromechanical conversion element in a direction of expansion or contraction of the electromechanical conversion element; a drive member that is fixed to the second end of the electromechanical conversion element in the direction of expansion or contraction; an engaging member that engages with the drive member with a friction force; and a drive circuit that drives the electromechanical conversion element. The drive circuit generates a rectangular waveform drive voltage and applies the rectangular waveform drive voltage to the electromechanical conversion element to cause the electromechanical conversion element to expand and contract at different speeds to thereby move the support member and the engaging member relative to each other.

23 Claims, 11 Drawing Sheets

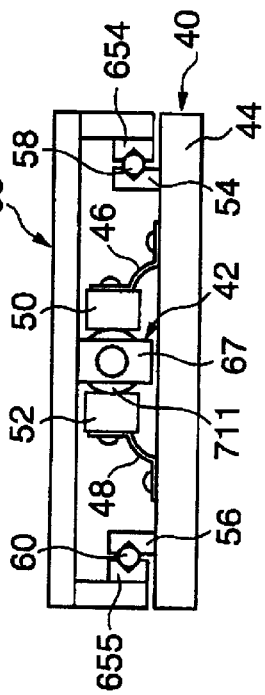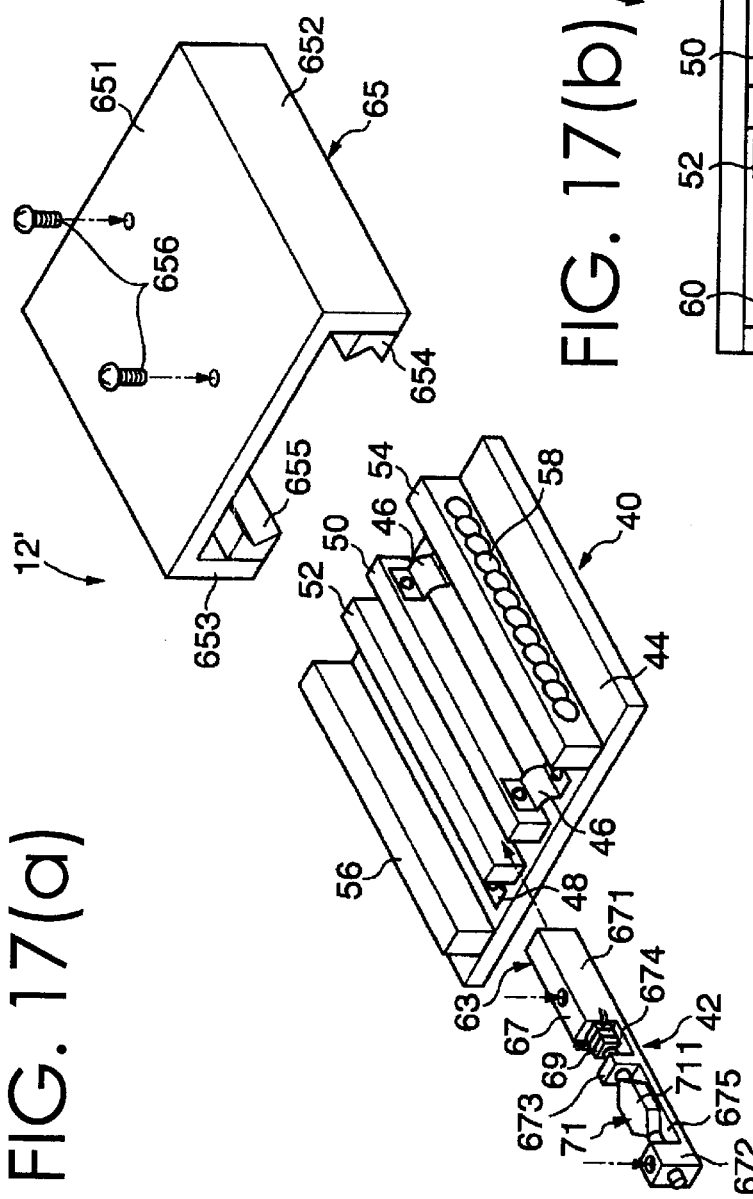

DRIVING APPARATUS AND METHOD OF USING SAME

CROSS-REFERENCE TO RELATED APPLICATION

The present application claims the priority of Japanese Patent Application No. 00-5 0081544, filed on Mar. 23, 2000 in Japan, the entire contents of which are hereby incorporated herein by reference.

BACKGROUND OF THE APPLICATION

1. Field of the Invention

The present invention relates to a driving apparatus, and more particularly to a driving apparatus appropriate for the driving of a movable XY stage, the photo-taking lens of a camera, the projecting lens of an overhead projector, or the lenses of binoculars, and the like.

2. Description of the Related Art

One driving apparatus known in the conventional art comprises an impact-type piezoelectric actuator wherein an engaging member to which a photo-taking lens is mounted is caused to engage with a cylindrical drive member such that a prescribed friction force occurs, and a piezoelectric element is attached to one end of the drive member. For example, FIG. 18 shows the basic construction of a driving apparatus for. adjusting the position of the photo-taking lens of a camera.

The driving apparatus 100 in this drawing comprises a piezoelectric element 101 that comprises an electromechanical conversion element, a cylindrical drive member 102 that is driven by the piezoelectric element 101, an engaging member 103 that engages with the drive member 102 through a prescribed friction force, and a drive circuit 104 that applies a drive voltage to the piezoelectric element 101.

The piezoelectric element 101 expands and contracts in response to the drive voltage applied by the drive circuit 104. One end of the piezoelectric element 101 is fixed to a support member 105 in the direction of expansion or contraction, while the other end is attached to one end of the drive member 102 along the axial direction. The photo-taking lens L comprising the driven object is mounted to the engaging member 103 at a prescribed location, and can move along the drive member 102 in the axial direction.

The drive circuit 104 comprises a waveform generating unit 107 and a power amp 108, as shown in FIG. 19. It inputs to the power amp 108 a drive voltage having a 0–5V sawtooth-type waveform obtained from the waveform generating unit 107, and outputs from the power amp 108 a drive voltage having a 0–10V sawtooth-type waveform.

In the driving apparatus 100 constructed as described above, when a drive voltage having the waveform shown in FIG. 20(a) that has gentle rising edges and steep falling edges (a so-called outward waveform) is repeatedly applied to the piezoelectric element 101 from the drive circuit 104, the engaging member 103 moves in the direction of the arrow (a), which is the outward direction (the direction away from the piezoelectric element 101) due to the expansion and contraction of the piezoelectric element 101. In other words, because the piezoelectric element 101 expands gradually during the gentle rising edge of the drive voltage, the engaging member 103 moves in the outward direction together with the drive member 102, and because the piezoelectric element 101 contracts suddenly during the steep falling edge, even though the drive member 102 moves in the return direction, the engaging member 103 slips relative to the drive member 102 and remains in essentially the same position. As a result, when a drive voltage having the waveform shown in FIG. 20(a) is repeatedly applied to the piezoelectric element 101, the engaging member 103 moves intermittently in the direction of the arrow (a).

When a drive voltage having the waveform shown in FIG. 20(b) that has steep rising edges and gentle falling edges (a so-called return waveform) is repeatedly applied to the piezoelectric element 101 from the drive circuit 104, the engaging member 103 moves in the return direction (the direction toward the piezoelectric element 101) opposite the direction of the arrow (a) due to the expansion and contraction of the piezoelectric element 101. In other words, because the piezoelectric element 101 expands suddenly during the steep rising edge of the drive voltage, even though the drive member 102 moves in the outward direction, the engaging member 103 slips relative to the drive member 102 and remains in essentially the same position, and because the piezoelectric element 101 contracts gradually during the gentle falling edge, the engaging member 103 moves in the return direction together with the drive member 102. As a result, when a drive voltage having the waveform shown in FIG. 26(b) is repeatedly applied to the piezoelectric element 101, the engaging member 103 moves intermittently in the direction opposite the direction of the arrow (a). By applying a drive voltage having the waveform shown in either FIG. 20(a) or 20(b) to the piezoelectric element 101 in this way, the photo-taking lens L can be moved in the outward direction or the return direction.

The drive circuit 104 may have the construction shown in FIG. 21, for example. The drive circuit 104 shown in the drawing comprises a first drive circuit 109 consisting of a slow-charging circuit and a rapid-charging circuit, and a second drive circuit 110 consisting of a rapid-charging circuit and a slow-charging circuit, and carries out the drive control of the drive circuits 109 and 110 through prescribed 0–5V control signals generated by a digital circuit.

In other words, the first drive circuit 109 has a construction in which two switches 111 and 112 are serially connected with a constant-current source 113 such that the constant-current source 113 comes between the switches 111 and 112 with respect to the power supply voltage Vs, while the second drive circuit 110 has a construction in which two switches 114 and 115 are serially connected with a constant-current source 116 such that the constant-current source 116 comes between the switches 114 and 115 with respect to the power supply voltage Vs. The piezoelectric element 101 is connected to both ends of the switch element 112 in the first drive circuit 109 and to both ends of the serial circuit connecting the switch element 115 and the constant-current source 116 in the second drive circuit 110.

In the drive circuit 104 shown in FIG. 21, a slow-charging circuit is formed through the closing of the switch 111 of the first drive circuit 109, and a rapid-charging circuit is formed through the subsequent opening of the switch 111 and the closing of the switch 112. By repeatedly carrying out these switch operations through control signals, a drive voltage having the outward waveform shown in FIG. 20(a) is repeatedly applied to the piezoelectric element 101.

Similarly, a rapid-charging circuit is formed through the closing of the switch 114 of the second drive circuit 110, and a slow-charging circuit is formed through the subsequent opening of the switch 114 and the closing of the switch 115. By repeatedly carrying out these switch operations through control signals, a drive voltage having the return waveform shown in FIG. 20(b) is repeatedly applied to the piezoelectric element 101. In this way, the photo-taking lens L can be moved in both the outward and return directions as a result of the movement of the engaging member 103 in the outward and return directions as described above.

When a driving apparatus comprising an impact-type piezoelectric actuator is applied as the drive source for an optical system such as a camera photo-taking lens, it is preferred that the driving apparatus be as inexpensive and compact as possible. However, with the conventional driving apparatus 100, where the drive circuit 104 shown in FIG. 19 is used, the circuit to generate signals having a sawtooth-type waveform is complex, and therefore the problem arises that the goals of low cost and compactness become difficult to achieve. This problem also arises with the drive circuit 104 shown in FIG. 21 as well, because the constant-current sources 113 and 116 have a complex circuit construction.

OBJECTS AND SUMMARY

An object of the present invention is to provide a driving apparatus through which low cost and compactness may be effectively achieved.

In order to achieve the above object, the present invention may include a driving apparatus, comprising an electromechanical conversion element that expands and contracts through the application of a drive voltage, the electromechanical conversion element includes a first end, a second end, and a resonance frequency, a support member that is fixed to the first end of the electromechanical conversion element in a direction of expansion or contraction of the electromechanical conversion element, a drive member that is fixed to the second end of the electromechanical conversion element in the direction of expansion or contraction, an engaging member that engages with the drive member with a friction force, and a drive circuit that drives the electromechanical conversion element, wherein said drive circuit generates a rectangular waveform drive voltage and applies the rectangular waveform drive voltage to said electromechanical conversion element to cause said electromechanical conversion element to expand and contract at different speeds to thereby move the support member and the engaging member relative to each other.

Using this construction, because the displacement waveform for the expansion and contraction of the electromechanical conversion element is a sawtooth-type waveform even when the drive voltage applied to the electromechanical conversion element comprises a rectangular waveform, the support member and the engaging member can be moved relative to each other due to the fact that the electromechanical conversion element expands and contracts at different speeds. Therefore, using the present invention, because the drive voltage applied to the electromechanical conversion element can have a rectangular waveform, the construction of the drive circuit may be simplified and the driving apparatus may be made smaller and at a lower cost. Furthermore, the relationship between the drive frequency fd and the resonance frequency fr of the electromechanical conversion element to which the support member and drive member are fixed should be expressible by about fd >0.3×fr or about fd <1.5×fr.

The drive voltage may have a duty ratio D that is expressed by about 0.05<D <0.45. Using this construction, the engaging member is moved in the outward direction due to the fact that the displacement waveform for the expansion and contraction of the electromechanical conversion element has a sawtooth configuration with gentle rising edges and steep falling edges. As a result, the photo-taking lens or other driven object attached to the engaging member may be moved in the outward direction away from the electromechanical conversion element.

The drive voltage may also have a duty ratio D that is expressed by about 0.55<D <0.95. Using this construction, the engaging member is moved in the return direction due to the fact that the displacement waveform for the expansion and contraction of the electromechanical conversion element has a sawtooth configuration with steep rising edges and gentle falling edges. As a result, the photo-taking lens or other driven object attached to the engaging member may be moved in the return direction toward the electromechanical conversion element.

BRIEF DESCRIPTION OF THE DRAWINGS

FIG. 4 is a drawing showing the waveforms of the drive pulses output from the drive circuit shown in FIG. 3. FIG. 4(a) shows the waveform when the duty ratio is set to 0.3, while

FIG. 13 is a drawing showing the relationship between the drive voltage having a drive frequency outside the range of the present invention and the displacement waveform of the expansion and contraction of the piezoelectric element.

FIG. 17 is a drawing showing an example of a different construction of the drive unit of the driving apparatus shown in FIG. 1. FIG. 17(a) is a perspective view showing the components in a disassembled fashion, and FIG. 17(b) is a front view.

FIG. 20 is a drawing showing the output waveforms of the drive circuit shown in FIG. 19.

DETAILED DESCRIPTION OF THE PREFERRED EMBODIMENTS

Figure 1:
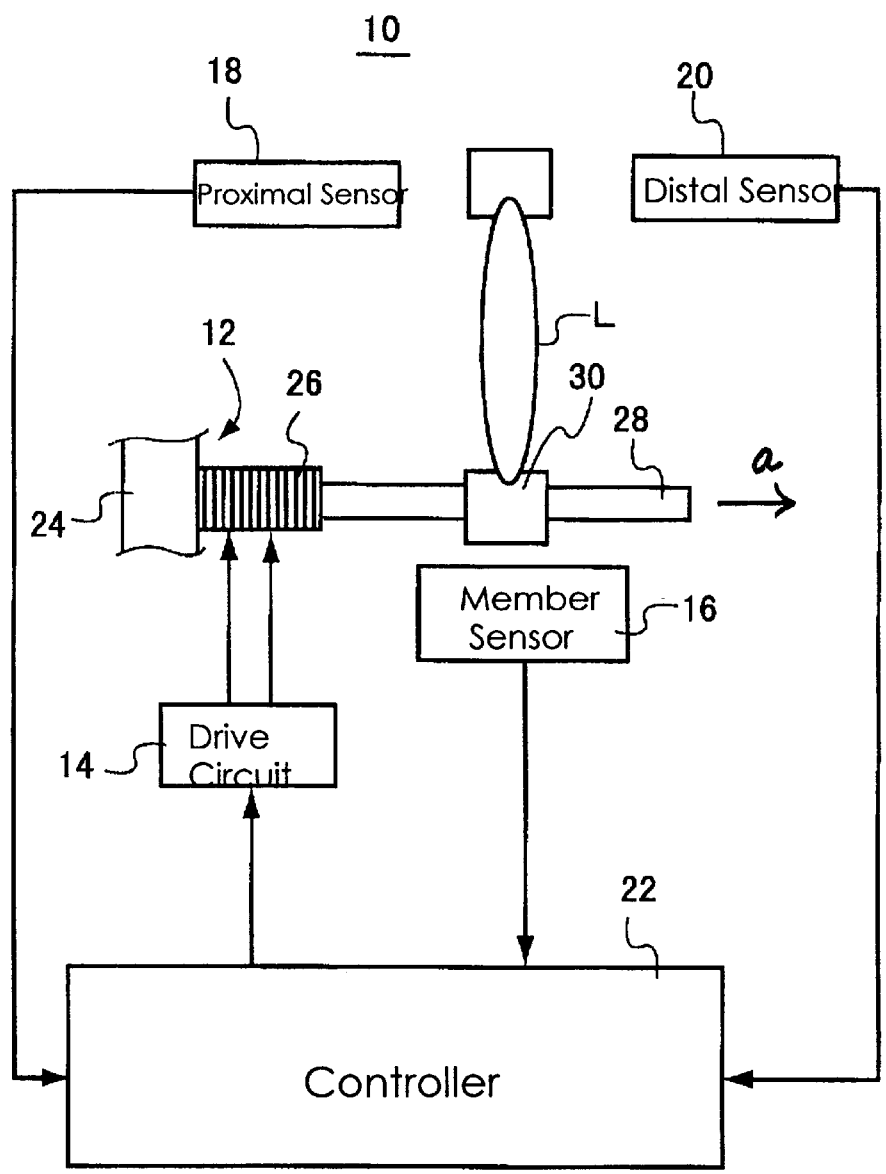
FIG. 1 is a drawing showing the basic overall construction of a driving apparatus pertaining to one embodiment of the present invention.

FIG. 1 is a block diagram showing the basic construction of a driving apparatus comprising an impact-type piezoelectric actuator pertaining to an embodiment of the present invention. In the drawing, the driving apparatus 10 comprises a drive unit 12, a drive circuit 14 that drives the drive unit 12, a member sensor 16 that detects the position of the engaging member mounted to the drive unit 12, a proximal sensor 18 that is adjacent to the proximal end of the drive unit 12, a distal sensor 20 that is adjacent to the distal end of the drive unit 12, and a controller 22 that controls the overall operation.

While the driving apparatus comprising a conventional impact-type piezoelectric actuator can perform driving through the application of a drive voltage having a sawtooth configuration waveform to the piezoelectric element, the present invention utilizes a drive: voltage with an easily-generated rectangular waveform. When the drive frequency of the drive voltage has a specific relationship to the resonance frequency of the piezoelectric element of the system, the displacement of the piezoelectric element exhibits a sawtooth configuration waveform during its expansion and contraction. As a result, the driving apparatus can perform driving based on this displacement, i.e., the movement of the support member 24 and the engaging member 30 described below relative to each other.

Figure 2:
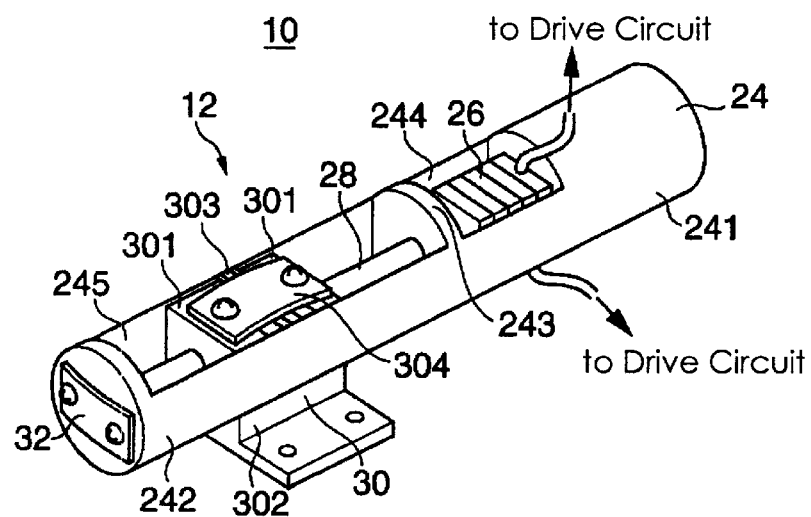
FIG. 2 is a perspective view showing an example of the construction of the drive unit of the driving apparatus shown in FIG. 1.

FIG. 2 is a perspective view showing an example of the construction of the drive unit 12. In the drawing, the drive unit 12 has a fixed-element type construction, and comprises a support member 24, a piezoelectric element 26, a drive member 28 and an engaging member 30.

The support member 24 holds the piezoelectric element 26 and the drive member 28, and has a first housing compartment 244 and a second housing compartment 245 that are formed by hollowing out the interior of the cylindrical support member except for the axial end areas 241 and 242 thereof and a partition wall 243 positioned in approximately the center thereof. The first housing compartment 244 houses the piezoelectric element 26 such that the direction of expansion or contraction thereof, i.e., its polar direction, is aligned with the axial direction of the support member 24. The second housing compartment 245 houses the drive member 28 and a part of the engaging member 30.

The piezoelectric element 26 has a stacked construction in which multiple piezoelectric substrates having a prescribed thickness are stacked together with an electrode (not shown in the drawing) placed between each piezoelectric substrate. One end of the piezoelectric element 26 in the lengthwise direction, i.e., the direction of expansion or contraction (the stacking direction) is fixed to the end surface of the end area 241 of the first housing compartment 244. A centrally-positioned round hole is formed in the other end area 242 of the support member 24 and the partition wall 243, and a rod-shaped drive member 28 having a round cross-sectional configuration is housed in the second housing compartment 245 such that it runs through the round holes and can move in the axial direction.

The end of the drive member 28 that protrudes into the first housing compartment 244 is fixed to the other end surface of the piezoelectric element 26, and the end of the drive member 28 that protrudes outside the second housing compartment 245 is pressed by the plate spring 32 toward the piezoelectric element 26 with a prescribed degree of pressure. The pressure exerted on the drive member 28 by the plate spring 32 operates to stabilize the axial displacement of the drive member 28 caused by the expansion or contraction of the piezoelectric element 26.

The engaging member 30 comprises a base unit 302 having mounting units 301 located at both ends thereof along the axial direction of the drive member 28 and a grasped member 303 that is mounted between the two mounting units 301. The drive member 28 runs loosely through the base unit 302, and the grasped member 303 is pressed downward by a spring plate 304 mounted to both mounting units 301, thereby coming into contact with the drive member 28. As a result, the engaging member 30 engages with the drive member 28 through a prescribed friction force, whereby the engaging member 30 can be moved along the axial direction of the drive member 28 when a drive force stronger than the friction force is applied thereto. A photo-taking lens L (see FIG. 1) comprising the driven object is mounted to the engaging member 30.

Figure 3:
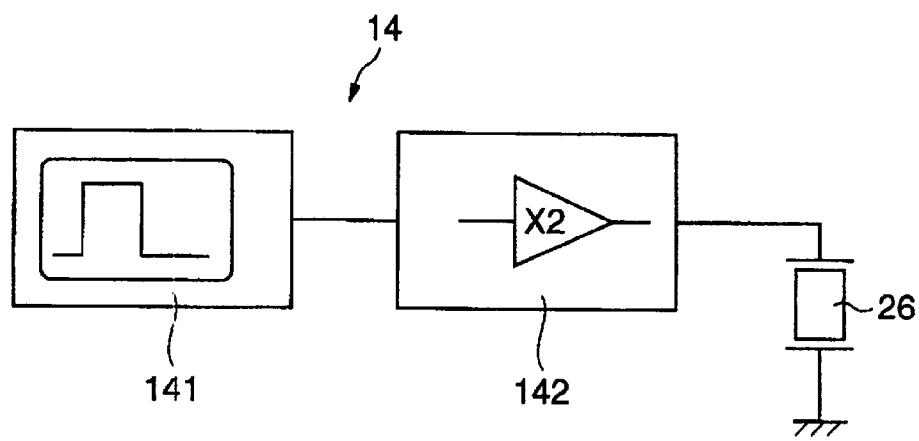
FIG. 3 is a block diagram showing an example of the construction of the drive circuit of the driving apparatus shown in FIG. 1.

FIG. 3 is a drawing showing an example of the construction of the drive circuit 14. In the drawing, the drive circuit 14 continuously outputs a drive voltage having a rectangular waveform, and through the application of this drive voltage to the piezoelectric element 26, the displacement waveform during expansion and contraction of the piezoelectric element 26 has a sawtooth configuration waveform. The drive circuit 14 comprises a waveform generating unit 141 that consists of a digital circuit, as well as a power amp 142. The waveform generating unit 141 generates and supplies to the power amp 142 a drive voltage comprising, for example, a 0–5V rectangular waveform, and the power amp 142 amplifies the drive voltage supplied by the waveform generating unit 141 to a drive voltage comprising, for example, a 0–10V rectangular waveform, and applies the amplified voltage to the piezoelectric element 26.

Figure 4A:
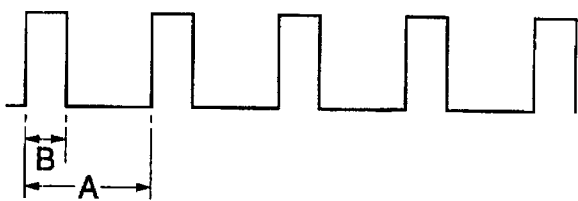

FIG. 4 shows one example of the pulse waveform of the drive voltage that is output from the drive circuit 14 and applied to the piezoelectric element 26, and that can move the support member 24 and the engaging member 30 relative to each other through a sawtooth configuration displacement waveform during expansion and contraction of the piezoelectric element 26. FIG. 4(a) is the pulse waveform of the drive voltage to move the engaging member 30 in the direction of the arrow (a) in FIG. 1 (the direction away from the piezoelectric element 26), i.e., the outward direction. The drive frequency fd of this drive voltage is set to a value equal to 0.7 times the resonance frequency fr (for example, 50 KHz) of the piezoelectric element 26, the support member 24, and the drive member 28 (i.e., fd=0.7×fr). The duty ratio D (D=B/A) is set to 0.3, wherein A is the period of the waveform and B is the pulse width.

Figure 4B:
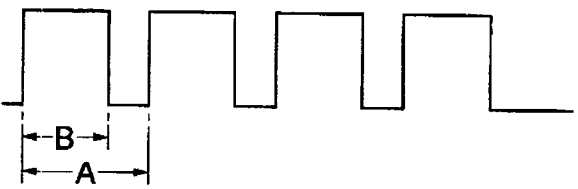
FIG. 4(b) shows the waveforms when the duty ratio is set to 0.7.

FIG. 4(b) is the pulse waveform of the drive voltage to move the engaging member 30 in the return direction opposite the arrow (a) in FIG. 1 (the direction toward the piezoelectric element 26), wherein the drive frequency fd of this drive voltage is set to a value equal to 0.7 times the resonance frequency fr of the piezoelectric element 26, the support member 24, and the drive member 28 (i.e., fd=0.7×fr), and the duty ratio D (D=B/A) is set to 0.7.

Figure 5:
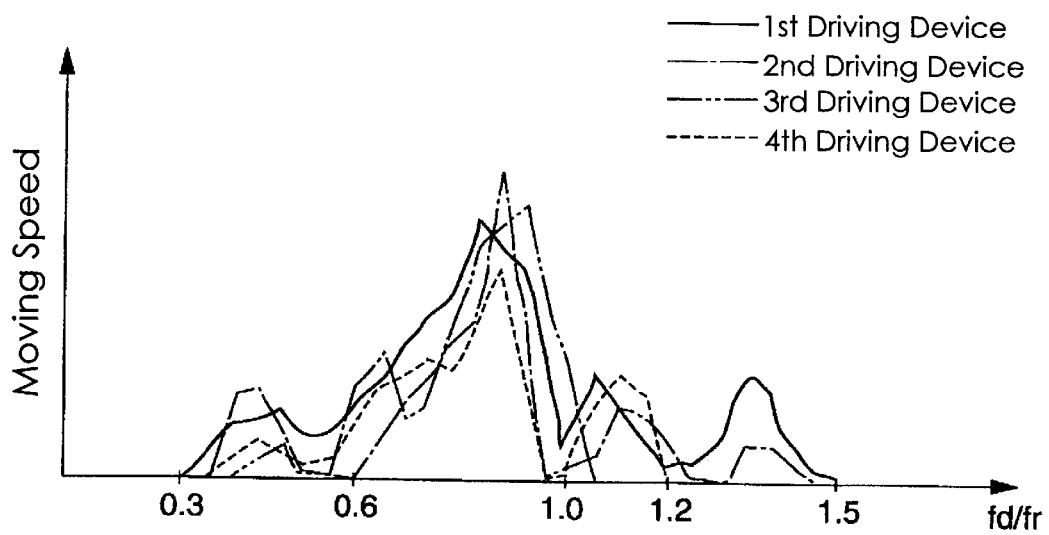
FIG. 5 is a drawing showing the relationship between fd/fr and the engaging member movement speed in the driving apparatus shown in FIG. 1.
Figure 6:
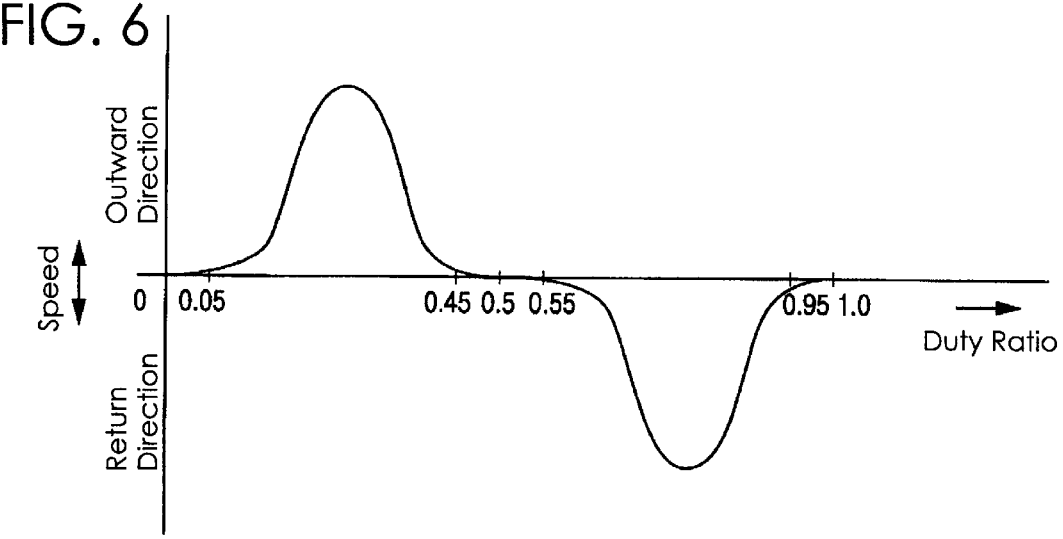
FIG. 6 is a drawing showing the relationship between the duty ratio of the drive voltage and the engaging member movement speed in the driving apparatus shown in FIG. 7 is a drawing showing the relationship between the drive voltage impressed to the piezoelectric element of the driving apparatus shown in FIG. 1 and the displacement waveform of the expansion and contraction of the piezoelectric element.

The setting of the drive frequency fd and the duty ratio D of the drive voltage to the values described above is based on the fact that (a) the ratio fd/fr of the drive voltage frequency fd to the resonance frequency fr of the piezoelectric element 26 to which the support member 24 and the drive member 28 are fixed, and the speed of movement of the engaging member 30 have the relationships shown in the characteristic graph in FIG. 5, and (b) the duty ratio D of the drive voltage comprising a rectangular waveform and the directions of movement (outward direction and return direction) of the engaging member 30 have the relationships shown in the characteristic graph in FIG. 6.

The characteristic graph shown in FIG. 5 plots the ratio fd/fr of the drive voltage frequency fd to the resonance frequency fr of the piezoelectric element 26, the support member 24, and the drive member 28 against the speed of movement of the engaging member 30 for each of four different types (first through fourth) of driving apparatuses 10 having differing resonance frequencies fr of the piezoelectric element 26, the support member 24, and the drive member 28.

With regard to the four examples illustrated in FIG. 5, the first, second, third, and fourth driving devices have the following resonance frequencies: 66 k Hz; 133 k Hz; 150 k Hz; and 200 k Hz, respectively.

This characteristic chart of FIG. 5 applies to the case in which the duty ratio D of the drive voltage comprising a rectangular waveform is about 0.3 (i.e., the case in which the engaging member 30 is moved in the outward direction as described below), but the essentially identical relationship is confirmed to exist not only where the duty ratio D is about 0.7 (i.e., the case in which the engaging member 30 is moved in the return direction as described below), but also where the duty ratio D falls within the range of about 0.05 to 0.95.

As is clear from the characteristic graph shown in FIG. 5, where the value of fd/fr falls within the range of about 0.3 to 1.5, although the speed of movement decreases in certain regions, the engaging member 30 is, as a practical matter, movable. When the value of fd/fr falls below about 0.3 or exceeds about 1.5, the engaging member 30 cannot generally be moved. Therefore, the value of the drive voltage frequency fd in relation to the resonance frequency fr of the piezoelectric element 26 is not limited to the values shown in FIG. 4, but may be set appropriately within the range about 0.3×fr<fd<1.5×fr, where necessary. Where the value of fd/fr falls between 0.6 and 1.2, all of the first through fourth driving apparatuses 10 have sufficient operability The characteristic graph shown in FIG. 6 plots the duty ratio D of the drive voltage comprising a rectangular waveform against the directions of movement of the engaging member 30 (i.e., the outward direction and the return direction). As is clear from the graph, the engaging member 30 moves in the outward direction when the duty ratio D falls within the range of about 0.05 to 0.45 (0.05<D<0.45), and moves in the return direction when the duty ratio D falls within the range of about 0.55 to 0.95 (0.55<D<0.95). Therefore, the duty ratio D may be set not only as shown in FIG. 4, but may be set appropriately within the range of about 0.05<D<0.45 or 0.55<D<0.95, where necessary.

The resonance frequency fr of the piezoelectric element 26, the support member 24, and the drive member 28 is sought through the following equation:
Equation 1

$$fr = \frac{fro}{2} \sqrt{\frac{mp}{mp + 2mf}}$$

In Equation 1 above, fro indicates the free resonance frequency between each pair of electrodes in the piezoelectric element 26 (the resonance frequency in the inter-electrode direction of the piezoelectric element 26 itself), mp indicates the mass of the piezoelectric element 26, and mf indicates the mass of the drive member 28. While the mass of the support member 24 is related to the resonance frequency fr of the piezoelectric element 26 in the resonance system, it has a sufficiently large value compared to the sum of the masses mp and mf of the piezoelectric element 26 and the drive member 28, respectively, such that its effect on the resonance frequency fr is so small that it need not be taken into account as a calculation parameter. Moreover, because the engaging member 30 slips relative to the drive member 28 when the piezoelectric element 26 resonates, as a practical matter it need not be considered an element of the resonance system, and is not included as a calculation parameter in Equation 1 above.

Figure 7A:
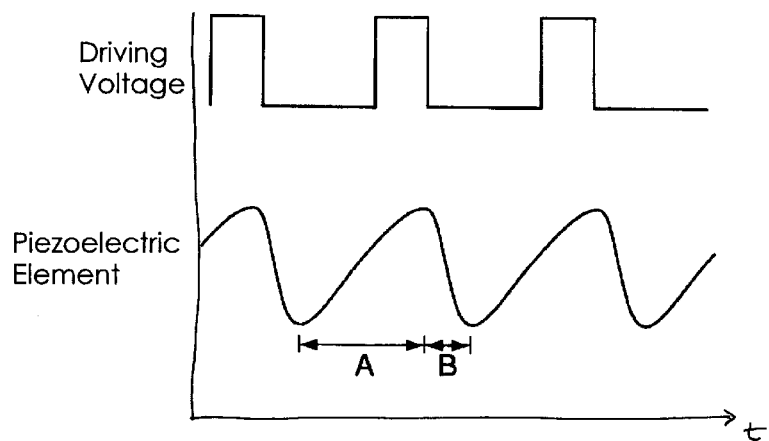
FIG. 7(a) shows the case where the drive voltage duty ratio is set to 0.3.
Figure 7B:
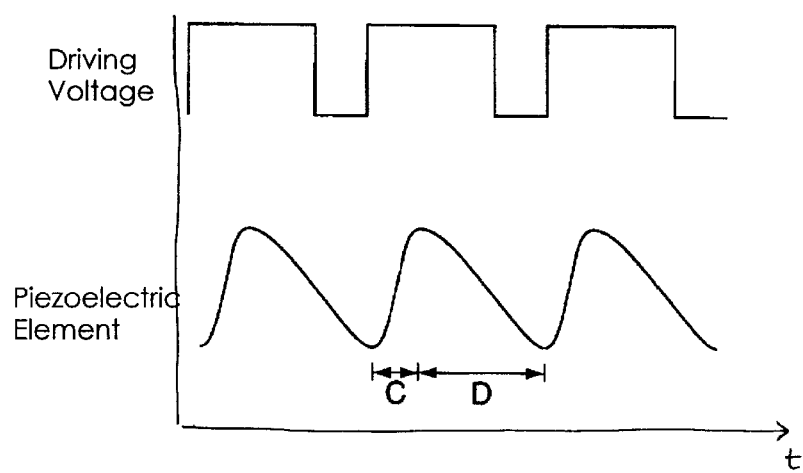
FIG. 7(b) shows the case where the drive voltage duty ratio is set to 0.7.

FIG. 7 is a drawing showing the relationship between the pulse waveform of the drive voltage applied to the piezoelectric element 26 from the drive circuit 14 and the displacement caused by the expansion and contraction of the piezoelectric element 26. FIG. 7(a) shows the case in which the drive voltage shown in FIG. 4(a) is applied, while FIG. 7(b) shows the case in which the drive voltage shown in FIG. 4(b) is applied. The displacement waveforms for the expansion and contraction of the piezoelectric element 26 are shown in a simplified fashion as measured by a laser Doppler vibrometer.

As shown in the drawing, it was confirmed that when the drive voltage shown in FIG. 4(a) is applied to the piezoelectric element 26, the displacement waveform for the piezoelectric element 26 has a sawtooth configuration with gentle rising edges A and steep falling edges B, while when the drive voltage shown in FIG. 4(b) is applied to the piezoelectric element 26, the displacement waveform for the piezoelectric element 26 has a sawtooth configuration with steep rising edges C and gentle falling edges D.

In other words, when the displacement waveform for the piezoelectric element 26 comprises a waveform having gentle rising edges A as shown in FIG. 7(a) (i.e., when the piezoelectric element 26 expands slowly), the engaging member 30 moves in the outward direction together with the drive member 28, while when the displacement waveform for the piezoelectric element 26 comprises a waveform having steep falling edges B as shown in FIG. 7(a) (i.e., when the piezoelectric element 26 contracts suddenly), the drive member 28 moves in the return direction, but the engaging member 30 slips relative to the drive member 28 and remains in essentially the same position. As a result, the engaging member 30 is intermittently moved in the outward direction through the repeated application of the drive voltage shown in FIG. 7(a) to the piezoelectric element 26.

When the displacement waveform of the piezoelectric element 26 comprises a waveform having steep rising edges C as shown in FIG. 7(b) (i.e., when the piezoelectric element 26 expands suddenly), the drive member 28 moves in the outward direction, but the engaging member 30 slips relative to the drive member 28 and remains in essentially the same position, while when the displacement waveform of the piezoelectric element 26 comprises a waveform having gentle falling edges D as shown in FIG. 7(b) (i.e., when the piezoelectric element 26 contracts slowly), the engaging member 30 moves in the return direction together with the drive member 28. As a result, the engaging member 30 is intermittently moved in the return direction through the repeated application of the drive voltage shown in FIG. 7(b) to the piezoelectric element 26.

When the drive voltages shown in FIGS. 4(a) and 4(b), for example, are applied to the piezoelectric element 26 as described above, the displacement waveform of the piezoelectric element 26 has a sawtooth configuration for the following reason, that is, while a rectangular waveform comprises sine waves as the basic waves and multiple-order harmonic waves, when the drive frequency fd of the drive voltage is more than about 0.3 times larger and less than about 1.5 times smaller than the resonance frequency fr of the piezoelectric element 26 (i.e., 0.3×fr<fd<1.5×fr), the effect of the resonance frequency fr of the piezoelectric element 26 in the system causes the gain of the higher-order harmonics (those of the third order and higher) among the harmonic components forming the rectangular waveforms to be significantly attenuated, and as a result the drive voltage applied to the piezoelectric element 26 comes to have a waveform comprising essentially the basic waves and second-order harmonic waves (i.e., a sawtooth configuration waveform).

Figure 8:
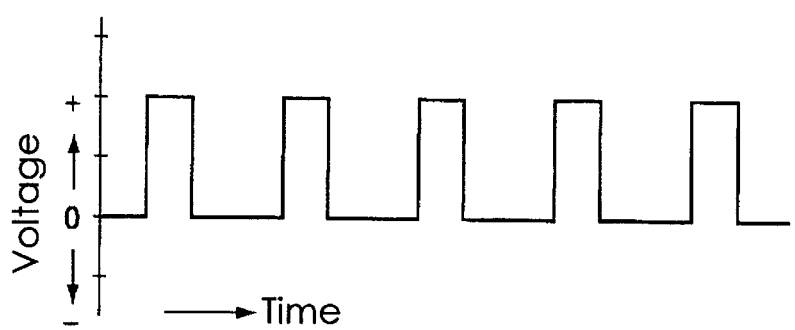
FIG. 8 is a drawing showing the drive voltage that is applied to the piezoelectric element and comprises a rectangular waveform.
Figure 9:
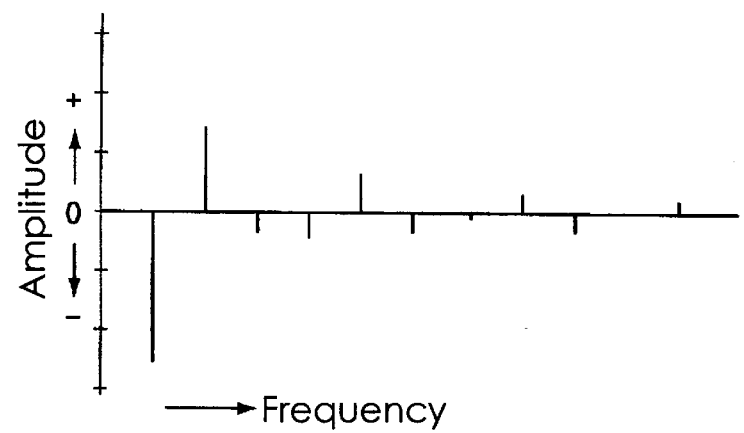
FIG. 9 is a drawing showing the base wave and the harmonic wave components obtained through Fourier conversion of the drive voltage shown in FIG. 8.
Figure 10:
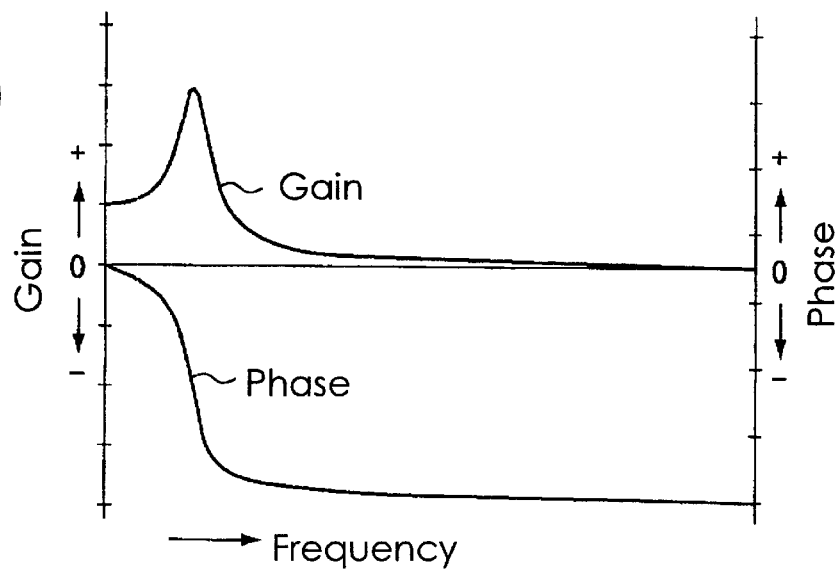
FIG. 10 is a drawing showing the resonance characteristic of the piezoelectric element to which the support member and the drive member are fixed.

In other words, one pulse comprising a component of the drive voltage having a rectangular waveform as shown in FIG. 8 (for example, a voltage wherein the drive frequency fd is more than about 0.3 times larger add less than about 1.5 times smaller than the resonance frequency fr of the piezoelectric element 26) may be expressed through Fourier conversion as having multiple-order harmonics f2, f3, . . . fn in addition to the basic wave f1, as shown in FIG. 9. On the other hand, with regard to the resonance characteristic of the piezoelectric element 26 to which the support member 24 and the drive member 28 are fixed, the gain for the third-order harmonic f3 and higher harmonic frequency regions shown in FIG. 9 is significantly attenuated, as shown in FIG. 10.

Figure 11:
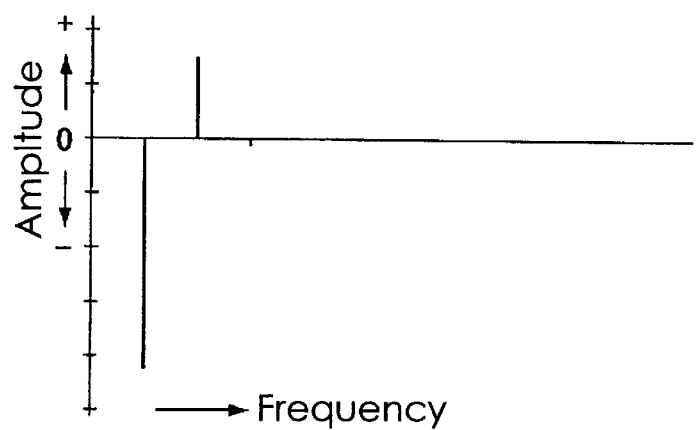
FIG. 11 is a drawing showing the base wave and the harmonic wave components when the drive voltage shown in FIG. 8 is applied to the piezoelectric element having the resonance characteristic shown in FIG. 10.
Figure 12:
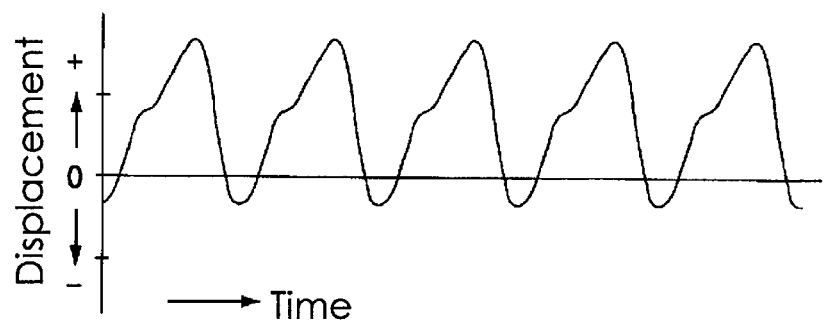
FIG. 12 is a drawing showing the displacement waveform for the piezoelectric element which is sought through reverse Fourier conversion of the base wave and the harmonic wave components shown in FIG. 11.

As a result, when a drive voltage having the rectangular waveform shown in FIG. 8 is applied to the piezoelectric element 26, the displacement waveform (vibration waveform) for the piezoelectric element 26 exhibits significantly attenuated third-order and higher harmonic components f3, . . . fn, and has essentially only the basic wave f1 and a second-order harmonic component f2, as shown in FIG. 11. The displacement waveform for the piezoelectric element 26 having the components shown in FIG. 11 can be sought through reverse Fourier conversion, and exhibits the sawtooth configuration shown in FIG. 12.

The reason that the direction of movement of the engaging member 30 switches between the outward direction and the return direction with a certain value of the duty ratio of the drive voltage functioning as the switching point is that the phase of the second-order harmonic relative to the basic wave is shifted in response to the duty ratio, causing the slopes of the falling edge and rising edge in the sawtooth-type waveform comprising the basic waves and the second-order harmonic waves to change. In other words, when the duty ratio D falls within the range of about 0.05<D<0.45, the shift in the phase of the second-order harmonic becomes large, and the engaging member 30 moves in the outward direction because the resulting sawtooth-type waveform has gentle rising edges and steep falling edges. When the duty ratio D falls within the range of about 0.55<D<0.95, the shift in the phase of the second-order harmonic becomes small, and the engaging member 30 moves in the return direction because the resulting sawtooth-type waveform has steep rising edges and gentle falling edges.

Figure 13A:
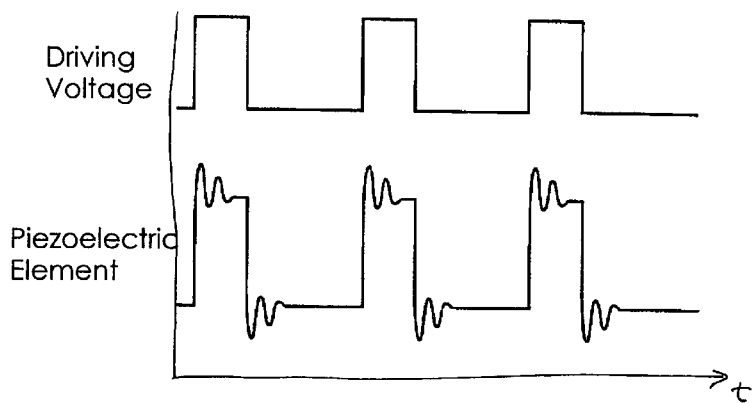
FIG. 13(a) shows the case where the drive voltage duty ratio is set to 0.3.
Figure 13B:
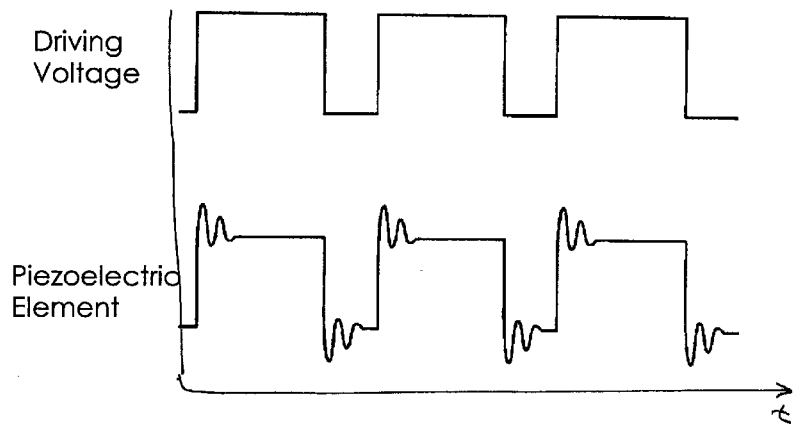
FIG. 13(b) shows the case where the drive voltage duty ratio is set to 0.7.

When the drive frequency fd of the drive voltage was set to a value equal to 0.1 times the resonance frequency fr of the piezoelectric element 26 (fd=0.1×fr) and the duty ratio of the drive voltage was set to 0.3, only ringing occurred in the flat part following the rise and the flat part following the fall of each rectangular waveform in the displacement waveform for the piezoelectric element 26, as shown in FIG. 13(a), and the displacement waveform did not comprise a sawtooth-type waveform. As a result, the engaging member 30 did not move. When the drive frequency fd of the drive voltage was set to a value equal to 0.1 times the resonance frequency fr of the piezoelectric element 26 (fd=0.1×fr) and the duty ratio of the drive voltage was set to 0.7, as shown in FIG. 13(b), only ringing occurred in the flat part following the rise and the flat part following the fall of each rectangular waveform in the displacement waveform for the piezoelectric element 26, as with regard to FIG. 13(a), and the displacement waveform did not comprise a sawtooth-type waveform. As a result, the engaging member 30 did not move.

Figure 14:
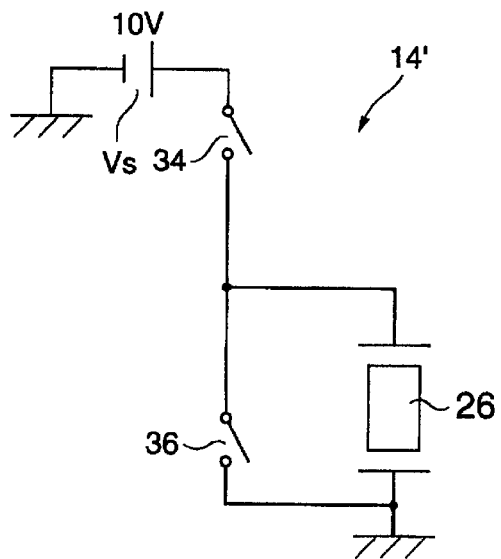
FIG. 14 is a block diagram showing an example of a different construction of the drive circuit of the driving apparatus shown in FIG. 1.
Figure 15:
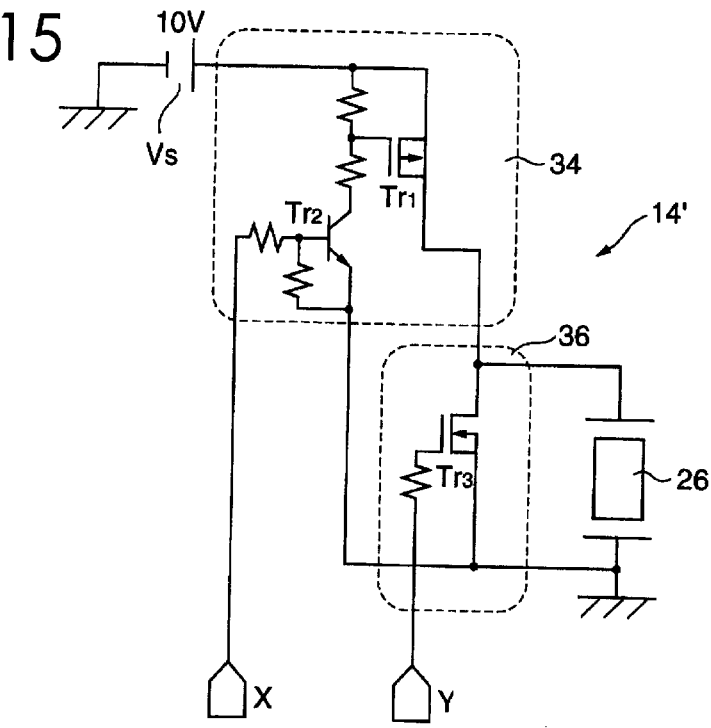
FIG. 15 is a drawing showing the specific circuit construction of the drive circuit shown in FIG. 14.

FIG. 14 is a drawing showing an example of a different construction of a drive circuit. The drive circuit 14' shown in FIG. 14 is constructed such that two switches 34 and 36 are serially connected to the power supply voltage Vs, and the piezoelectric element 26 is connected in parallel to the switch 36. FIG. 15 is a drawing showing the circuit construction of the drive circuit 14' shown in FIG. 14 in more specific detail. In the drawing, while the switch 34 includes a P-channel MOS transistor Tr1 and a bipolar transistor Tr2 that performs ON/OFF control for the MOS transistor Tr1, the switch 36 includes an N-channel MOS transistor Tr3, and the switches 34 and 36 are operated through the application via the X and Y terminals thereof of 0–5V control signals generated by a digital circuit.

Figure 16:
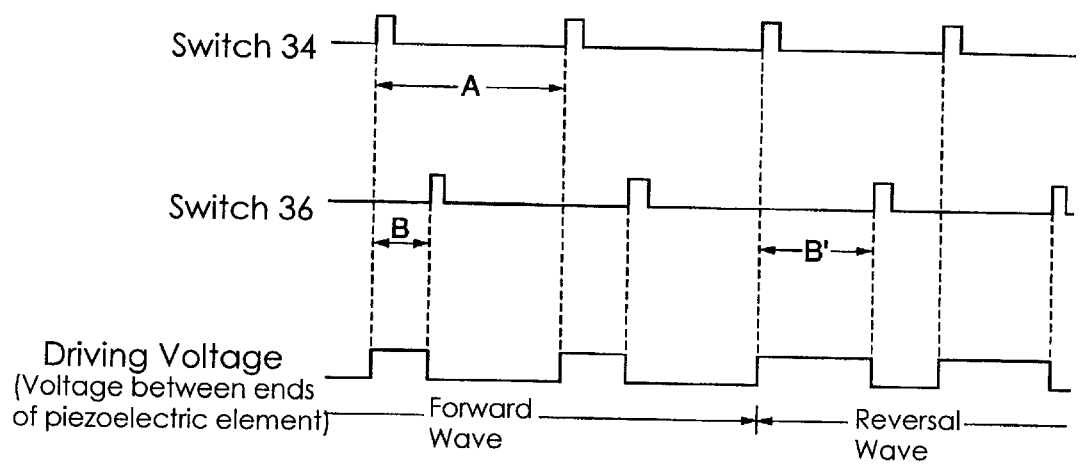
FIG. 16 is a timing chart to explain the operation of the drive circuits shown in FIGS. 14 and 15.
Figure 18:
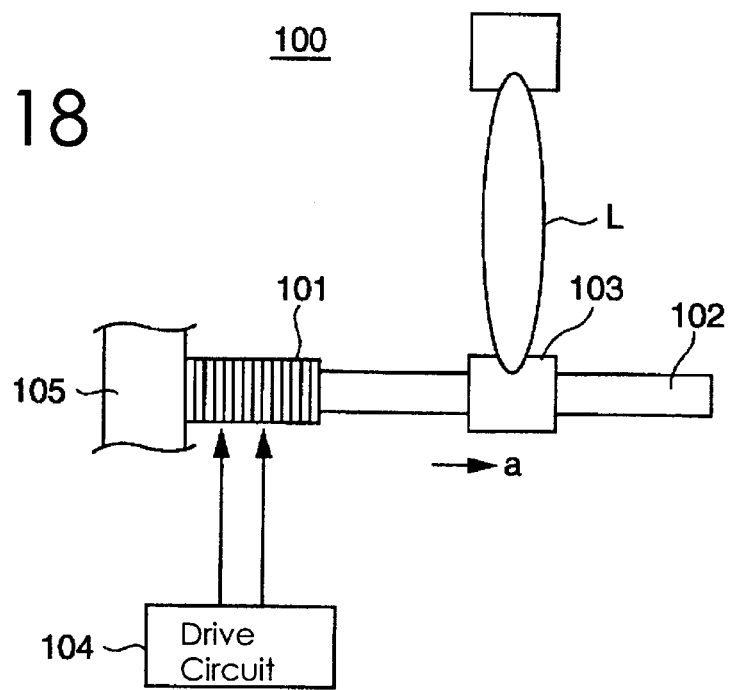
FIG. 18 is a drawing showing the basic construction of a conventional driving apparatus.
Figure 19:
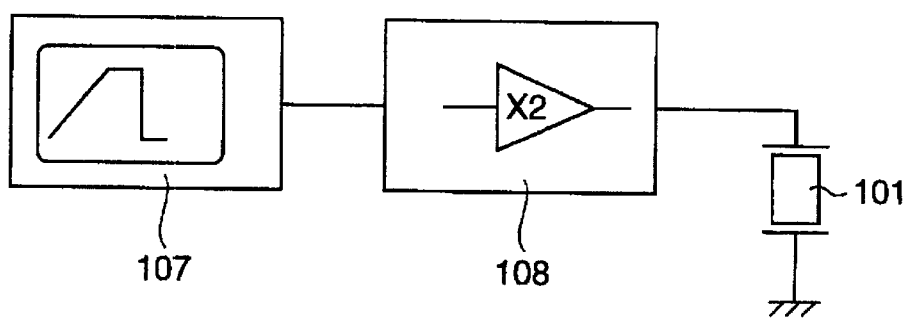
FIG. 19 is a block diagram showing an example of the construction of the drive circuit of the driving apparatus shown in FIG. 18.
Figure 20A:
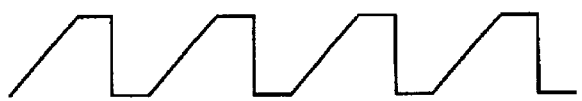
FIG. 20(a) is an outward waveform.
Figure 20B:
FIG. 20(b) is a return waveform.
Figure 21:
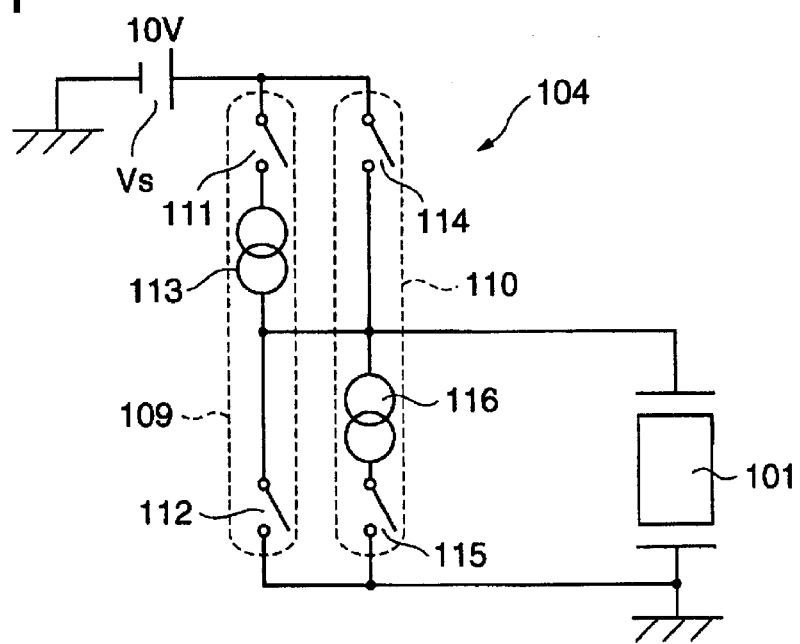
FIG. 21 is a block diagram showing an example of a different construction of the drive circuit of the driving apparatus shown in FIG. 18.

Through the drive circuit 14', as shown in FIG. 16, when the switch 34 is closed (i.e., when the MOS transistor Tr1 is turned ON) and kept closed for a short period of time, the charging of the piezoelectric element 26 by the power supply voltage Vs takes place rapidly via the switch 34 during that time. When the switch 36 is closed for a short time (i.e., the MOS transistor Tr3 is turned ON) after the switch 34 is opened (i.e., the MOS transistor Tr1 is turned OFF) and a certain period of time elapses, the charge supplied to the piezoelectric element 26 is discharged suddenly.

In other words, during the period between the time that the switch 34 is turned ON and the switch 36 is turned OFF, the piezoelectric element 26 is in essentially the identical state as when a drive voltage comprising a rectangular waveform is applied thereto. As a result, as shown in FIG. 16, by turning the switch 34 ON and OFF using certain cycles A, and turning the switch 36 ON and OFF at the time B or B' that is delayed by a certain period of time relative to the switch 34, both ends of the piezoelectric element 26 enter the state in which a drive voltage comprising an essentially rectangular waveform is repeatedly applied using prescribed cycles.

When this occurs, and when the duty ratio D (D=B/A) of the drive voltage (the voltage at both ends of the piezoelectric element 26) is between about 0.05 and 0.45 (i.e., 0.05<D<0.45), the drive pulses have an outward waveform that moves the engaging member 30 in the direction away from the piezoelectric element 26. When the duty ratio D of the drive voltage is between about 0.55 and 0.95 (i.e., 0.55<D<0.95), the drive pulses have a return waveform that moves the engaging member 30 in the direction toward the piezoelectric element 26. As described above, when the drive circuit 14' has the construction described above, the piezoelectric element 26 may be driven in the same fashion as in the case of the drive circuit 14 as shown in FIG. 3.

The drive unit 12 may be driven via the drive circuit 14 or 14' even if it does not have the fixed-element type construction shown in FIG. 2, but instead has, for example, a self-propelled type construction, as shown in FIG. 17. FIG. 17(a) is a perspective view of a drive unit 12 having a self-propelled type construction, in which the components are shown in a disassembled fashion, while FIG. 17(b) is a front view thereof.

The drive unit 12' shown in FIG. 17 comprises a fixed-position engaging member (base member) 40 and a moving member 42. The engaging member 40 comprises a base plate 44, a pair of holding members 50 and 52 that face each other across a prescribed distance in essentially the center of the base plate 44 and are mounted using tension members 46 and 48 such as springs, and a pair of guide members 54 and 56 that are mounted at the left and right edges of the base plate 44. Multiple freely rotatable ball members 58 and 60 are mounted to the outer side surface of the guide members 54 and 56, respectively.

The moving member 42 comprises a drive body 63 and a moving body 65 attached to the drive body 63. The drive body 63 comprises a support member 67, a piezoelectric element 69 and a drive member 71. The support member 67 holds the piezoelectric element 69 and the drive member 71, and has a first housing compartment 674 and a second housing compartment 675 that are formed by hollowing out the interior of the support member 67 except for the rectangular parallelepiped axial end areas 671 and 672 thereof and a partition wall 673 positioned in approximately the center thereof. The first housing compartment 674 houses the piezoelectric element 69 such that the direction of expansion or contraction thereof is aligned with the axial direction of the support member 67. The second housing compartment 675 houses the drive member 71 such that the drive member 71 is movable along the axis thereof.

The piezoelectric element 69 has the same construction as the piezoelectric element 26 shown in FIG. 2, and one end surface thereof in the longitudinal direction, i.e., the direction of expansion or contraction (the stacking direction). is fixed to one end surface of the end area 671 of the first housing compartment 674. The drive member 71 has an expansion unit 711 that expands in the left and right directions from the support member 67 and is integrally formed with the drive member 71 in the center thereof. This expansion unit 711 is positioned in the second housing compartment 675, and the end area of the drive member 71 that protrudes into the first housing compartment 674 via the pierced hole formed in the partition wall 673 is fixed to the other end surface of the piezoelectric element 69, while the end area of the drive member 71 that protrudes outside the second housing compartment 675 via the pierced hole formed in the other end area 672 of the support member 67 is left as a free end.

The moving body 65 has a flat plate 651 and side walls 652 and 653 that extend downward on the right and left sides from the flat plate 651. Sliding members 654 and 655 are formed on the insides of the side walls 652 and 653, respectively, and the moving body 65 is fixed to the upper surface of the support member 67 in the moving member 42 using screw members 656.

The moving member 42 constructed in this fashion is mounted to the engaging member 40 through the expansion unit 711 of the drive member 71 being movably held between the pair of holding members 50 and 52 of the engaging member 40. In other words, the drive unit 12' is constructed such that the engaging member 40 corresponds to the engaging member 30 in FIG. 2, and the engaging member 40 engages with the drive member 71 with a prescribed friction force.

Using the drive unit 12', when the drive voltage having the waveform shown in FIG. 4(a), for example, is applied from the drive circuit 14 or 14' and the piezoelectric element 69 expands slowly, the support member 67 moves to one side of the engaging member 40 while the drive member 71 does not move, and when the piezoelectric element 69 subsequently contracts suddenly, the drive member 71 overcomes the friction force exerted by the holding members 50 and 52 and moves to one side of the engaging member 40 while the support member 67 does not move. Through the repeated occurrence of this operation, the support member 67 is intermittently moved to one side of the engaging member 40 together with the moving body 65.

When the drive voltage having the waveform shown in FIG. 4(b), for example, is applied from the drive circuit 14 or 14' and the piezoelectric element 69 expands suddenly, the drive member 71 overcomes the friction force exerted by the holding members 50 and 52 and moves to the other side of the engaging member 40 while the support member 67 does not move, and when the piezoelectric element 69 subsequently contracts slowly, the support member 67 moves to the other side of the engaging member 40 while the drive member 71 does not move. Through the repeated occurrence of this operation, the support member 67 is intermittently moved to the other side of the engaging member 40 together with the moving body 65.

Returning to FIG. 1, the member sensor 16 is located within the movable range of the engaging member 30, and comprises an appropriate sensor such as an MRE (magneto resistive effect) element or a PSD (position sensitive device) element. The proximal sensor 18 and the distal sensor 20 each comprise an appropriate sensor such as a photointerrupter. Through the use of these sensors, the movement of the engaging member 30 to a prescribed position can be controlled through detection of the position of the engaging member 30 by the member sensor 16, while the movement beyond the prescribed position can be prohibited through detection of the position of the engaging member 30 by the proximal sensor 18 and the distal sensor 20. Furthermore, the controller 22 comprises a CPU that performs calculation processing, a ROM in which is stored a processing program and data, and a RAM that temporarily stores data, and carries out drive control of the drive circuit 14 or 14' based on signals input from the member sensor 16, the proximal sensor 18 and the distal sensor 20.

As described above, in the driving apparatus 10 pertaining to an embodiment of the present invention, the drive circuit 14 or 14' applies a drive voltage comprising a rectangular waveform to the piezoelectric element 26 or 69, and because the drive frequency of the drive voltage has a prescribed relationship to the resonance frequency of the piezoelectric element 26 or 69 to which the support member 24 or 67 and the drive member 28 or 71 are fixed, such that the displacement waveform of the expansion and contraction of the piezoelectric element 26 or 69 has a sawtooth configuration, the speeds of expansion and contraction of the piezoelectric element 26 or 69 may be made different from each other even if the drive voltage applied to the piezoelectric element 26 or 69 has a rectangular waveform, and as a result, the support member 24 or 67 and the engaging member 30 or 40 may be made to move relative to each other. Consequently, the construction of the drive circuit may be simplified and the driving apparatus 10 may be made more inexpensive and compact.

The present invention is not limited to the embodiment described above, and variations thereof may be adopted. For example, in the above embodiment, the drive circuit 14 or 14' applies a drive voltage to the piezoelectric element 26 or 69 in only one direction, but the same drive voltage can be applied to the piezoelectric element 26 or 69 in both directions in an alternating fashion. If this is done, twice the drive voltage is effectively applied to the piezoelectric element 26 or 69, and the relative speed of movement of the support member 24 or 67 and the engaging member 30 or 40 may be increased.

It is acceptable if the drive voltage output from the drive circuit 14 or 14' has an essentially rectangular waveform, and if the displacement waveform for the piezoelectric element 26 or 69 has an essentially sawtooth configuration. Moreover, as described above, while the support member 24 or 67 and the engaging member 30 or 40 can be moved relative to each other when the drive frequency fd of the drive voltage has a relationship to the resonance frequency fr of the piezoelectric element 26 or 69 to which the support member 24 or 67 and the drive member 26 or 71 are fixed, that is expressed by about $0.3 \times fr < fd < 1.5 \times fr$, it is preferred as a practical matter that the relationship be expressible by about $0.6 \times fr < fd < 1.2 \times fr$.

It is not absolutely essential that the drive frequency fd of the drive voltage have the value described above relative to the resonance frequency fr of the piezoelectric element 26 or 69, and some variation may occur in accordance with the construction of the driving apparatus 10. Therefore, the drive frequency fd of the drive voltage may be set to any appropriate value relative to the resonance frequency fr of the piezoelectric element 26 or 69 so long as the displacement waveform of the expansion and contraction of the piezoelectric element 26 or 69 comprises a sawtooth configuration.

As described above, because the drive circuit (i) generates a rectangular waveform drive voltage that (a) causes the electromechanical conversion element to expand and contract at different speeds and (b) has a drive frequency having a prescribed relationship to the resonance frequency of the electromechanical conversion element to which the support member and drive member are fixed, and (ii) applies this drive voltage to the electromechanical conversion element, the construction of the drive circuit may be simplified and the driving apparatus may be made more inexpensive and compact. In such a situation, the relationship of the drive frequency fd to the resonance frequency fr of the electromechanical conversion element to which the drive member and the support member are fixed should be expressed by about $fd > 0.3 \times fr$ or $fd < 1.5 \times fr$, and more preferably by about $fd > 0.6 \times fr$ or $fd < 1.2 \times fr$.

When the duty ratio D of the drive voltage is expressed by about $0.05 < D < 0.45$, the displacement waveform of the expansion and contraction of the electromechanical conversion element comprises a sawtooth configuration having gentle rising edges and steep falling edges, and as a result the engaging member can be moved in the outward direction.

When the duty ratio D of the drive voltage is expressed by about $0.55 < D < 0.95$, the displacement waveform of the expansion and contraction of the electromechanical conversion element comprises a sawtooth configuration having steep rising edges and gentle falling edges, and as a result the engaging member can be moved in the return direction.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A driving apparatus, comprising:
   an electromechanical conversion element that expands and contracts through the application of a drive voltage, the electromechanical conversion element includes a first end and a second end,
   a support member that is fixed to the first end of the electromechanical conversion element in a direction of expansion or contraction of the electromechanical conversion element,
   a drive member that is fixed to the second end of the electromechanical conversion element in the direction of expansion or contraction,
   an engaging member that engages with the drive member with a friction force, and
   a drive circuit that drives the electromechanical conversion element,
   wherein said drive circuit generates a rectangular waveform drive voltage and applies the rectangular waveform drive voltage to said electromechanical conversion element to cause said electromechanical conversion element to expand and contract at different speeds to thereby move the support member and the engaging member relative to each other.

2. The driving apparatus according to claim 1, wherein the rectangular waveform drive voltage has a drive frequency fd having a relationship to a resonance frequency fr of said electromechanical conversion element, said support member, and drive member that is expressed by $fd > 0.3 \times fr$.

3. The driving apparatus according to claim 2, wherein the rectangular waveform drive voltage has a drive frequency fd having a relationship to the resonance frequency fr of said electromechanical conversion element, said support member, and drive member that is expressed by $fd < 1.5 \times fr$.

4. The driving apparatus according to claim 1, wherein the rectangular waveform drive voltage has a drive frequency fd having a relationship to a resonance frequency fr of said electromechanical conversion element, said support member, and drive member that is expressed by $fd < 1.5 \times fr$.

5. The driving apparatus according to claim 1, wherein the rectangular waveform drive voltage has a drive frequency fd having a relationship to a resonance frequency fr of said electromechanical conversion element, said support member, and drive member that is expressed by $fd > 0.6 \times fr$.

6. The driving apparatus according to claim 5, wherein the rectangular waveform drive voltage has a drive frequency fd having a relationship to the resonance frequency fr of said electromechanical conversion element, said support member, and drive member that is expressed by $fd < 1.2 \times fr$.

7. The driving apparatus according to claim 1, wherein the rectangular waveform drive voltage has a drive frequency fd having a relationship to a resonance frequency fr of said electromechanical conversion element, said support member, and drive member that is expressed by fd<1.2×fr.

8. The driving apparatus according to claim 1, wherein said drive voltage comprises a rectangular waveform in which the duty ratio D is expressed by about 0.05<D<0.45.

9. The driving apparatus according to claim 3, wherein said drive voltage comprises a rectangular waveform in which the duty ratio D is expressed by about 0.05<D<0.45.

10. The driving apparatus according to claim 1, wherein said drive voltage comprises a rectangular waveform in which the duty ratio D is expressed by about 0.55<D<0.95.

11. The driving apparatus according to claim 3, wherein said drive voltage comprises a rectangular waveform in which the duty ratio D is expressed by about 0.55<D<0.95.

12. A driving apparatus, comprising:
electromechanical means for expanding and contracting through the application of a drive voltage, the electromechanical means includes a first end and a second end,
a support member that is fixed to the first end of the electromechanical means in a direction of expansion or contraction of the electromechanical means,
a drive member that is fixed to the second end of the electromechanical means in the direction of expansion or contraction,
an engaging member that engages with the drive member with a friction force, and
a drive circuit connected to the electromechanical means,
wherein said drive circuit includes means for generating a rectangular waveform drive voltage and applying the rectangular waveform drive voltage to said electromechanical means to cause said electromechanical means to expand and contract at different speeds to thereby move the support member and the engaging member relative to each other.

13. A method of driving an apparatus, comprising:
connecting the apparatus to an engaging member that is engaged with a drive member with a friction force, and the drive member is fixed to one end of an electromechanical conversion element that expands and contracts through the application of a drive voltage in a direction of expansion or contraction of the electromechanical conversion element, and another end of the electromechanical conversion element is connected to a support member in the direction of expansion or contraction,
generating a rectangular waveform drive voltage with a drive circuit,
applying the rectangular waveform drive voltage to said electromechanical conversion element to cause said electromechanical conversion element to expand and contract at different speeds to thereby move the support member and the engaging member relative to each other.

14. The method according to claim 13, wherein the rectangular waveform drive voltage has a drive frequency fd having a relationship to a resonance frequency fr of said electromechanical conversion element, said support member, and drive member that is expressed by fd>0.3×fr.

15. The method according to claim 14, wherein the rectangular waveform drive voltage has a drive frequency fd having a relationship to the resonance frequency fr of said electromechanical conversion element, said support member, and drive member that is expressed by fd<1.5×fr.

16. The method according to claim 13, wherein the rectangular waveform drive voltage has a drive frequency fd having a relationship to a resonance frequency fr of said electromechanical conversion element, said support member, and drive member that is expressed by fd<1.5×fr.

17. The method according to claim 13, wherein the rectangular waveform drive voltage has a drive frequency fd having a relationship to a resonance frequency fr of said electromechanical conversion element, said support member, and drive member that is expressed by fd>0.6×fr.

18. The method according to claim 17, wherein the rectangular waveform drive voltage has a drive frequency fd having a relationship to the resonance frequency fr of said electromechanical conversion element, said support member, and drive member that is expressed by fd<1.2×fr.

19. The method according to claim 13, wherein the rectangular waveform drive voltage has a drive frequency fd having a relationship to a resonance frequency fr of said electromechanical conversion element, said support member, and drive member that is expressed by fd<1.2×fr.

20. The method according to claim 13, wherein said drive voltage comprises a rectangular waveform in which the duty ratio D is expressed by about 0.05<D<0.45.

21. The method according to claim 15, wherein said drive voltage comprises a rectangular waveform in which the duty ratio D is expressed by about 0.05<D<0.45.

22. The method according to claim 13, wherein said drive voltage comprises a rectangular waveform in which the duty ratio D is expressed by about 0.55<D<0.95.

23. The method according to claim 15, wherein said drive voltage comprises a rectangular waveform in which the duty ratio D is expressed by about 0.55<D<0.95.

* * * * *